Jan. 1, 1957 W. C. BOOTS 2,775,862
EXPANSIBLE BRACELET WITH DETACHABLE SLOT AND STUD CONNECTION
Filed Dec. 28, 1955

INVENTOR.
William C. Boots.
BY
Kenway, Jenney, Witter & Hildreth
Att'ys.

United States Patent Office 2,775,862
Patented Jan. 1, 1957

2,775,862

EXPANSIBLE BRACELET WITH DETACHABLE SLOT AND STUD CONNECTION

William C. Boots, Rumford, R. I., assignor to Foster Metal Products Incorporated, Attleboro, Mass., a corporation of Massachusetts Application December 28, 1955, Serial No. 555,894

1 Claim. (Cl. 59—79)

This invention comprises a new and improved link construction for an expansible bracelet providing convenient means for quickly and conveniently removing or adding one or more links to the bracelet in adjusting its length for wrists of different sizes.

Various solutions of this problem have been attempted heretofore. For example, one link of the bracelet has been provided with a key-hole slot and the other with a headed stud shaped to enter freely the circular opening of the key-hole slot by movement in line with the axis of the stud and then to be locked by transverse movement to the end of the slot. A disadvantage of this construction is that a substantial portion of the link must be punched out to form the circular opening, thus weakening the link where it has no superfluous area to spare. A second disadvantage is that undesirable disengagement is likely to occur at any time when the head of the stud happens to be moved into line with the circular opening.

The construction of the present invention obviates those disadvantages found in prior link constructions and due to its novel characteristics presents important and desirable results in strength, security and convenience of manipulation. These results are secured by providing one link with an elongated slot intersected at one end by a transverse slit and then bending the material of the link at opposite sides of the slit at upward and downward inclinations respectively, thus forming an inclined passage for the head of a stud when the latter is presented in a correspondingly inclined position.

It will be understood that the slot is formed without the removal of any metal from the link thus retaining as a part of the link the metal that must be removed in forming the circular opening of a key-hole slot. Moreover, security of the connection is greatly improved because passage of the stud head can only be effected when the head is presented at an angle corresponding to that of the inclined passage. This position never occurs in the ordinary wear of the bracelet but only when removed so that an angular relation of the connected links may be purposely effected.

Figure 1:
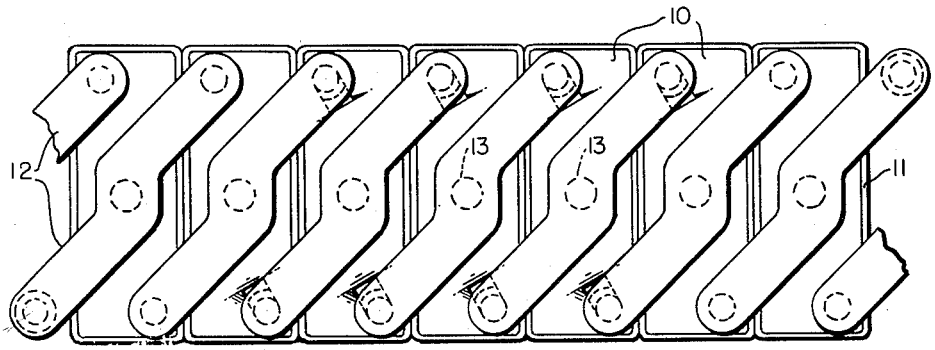
Figure 2:
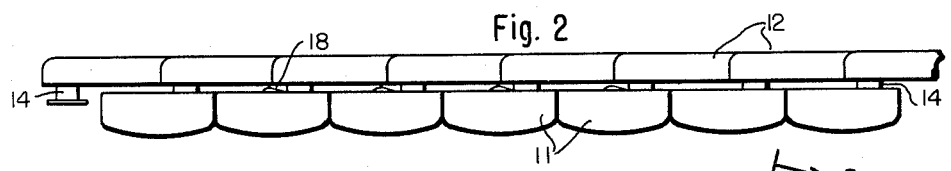
Figure 3:
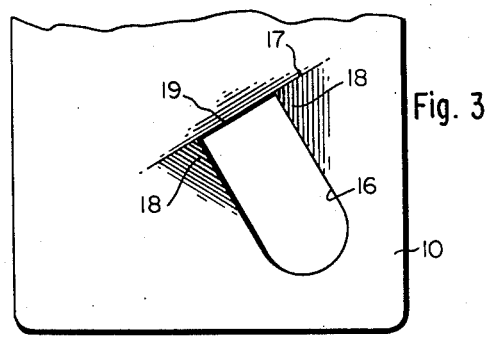

These and other features of the invention will be best understood and appreciated from the following description of a preferred embodiment thereof selected for purposes of illustration and shown in the accompanying drawings in which:

Fig. 1 is a plan view on an enlarged scale of an expansible bracelet as seen from below or inverted position, Fig. 2 is a corresponding view in elevation, Figs. 3, 4, 5 and 6 are fragmentary views on a greatly enlarged scale showing details of the connecting elements.

As herein shown the bracelet comprises a series of bottom links consisting of a flat rectangular base member 10 of sheet metal and an ornamental shell 11 which is secured to the base member by being crimped about its edges. It will be understood that the shells 11 are exposed to view when the bracelet is in place upon the wrist of the user and they are referred to in this description as the top links. The top links are connected, lazy tongs fashion, by bottom links 12 each having a central pivot connection 13 at the center of each base 10. The bottom links have a smoothly rounded surface for contact with the wrist of the wearer. The outer ends of the bottom links 12 are connected to adjacent bases 10 by the novel construction now to be described.

Each bottom link 12 is provided at each end with a stud having a cylindrical shank 14 and a flat disk-shaped head 15. Each base 10 is correspondingly provided with an elongated slot 16 which is inclined diagonally toward one corner of the base 10, being rounded at its outer end and intersected at its inner end by a straight transverse slit 17. No metal is removed in making the slit 17 but material of the base 10 is bent upwardly from the slot on each side of the slot 16 in areas 18. The material of the base is bent downwardly or inwardly at the side of the slit 17 opposite to the slot 16 in an area 19.

Figure 4:
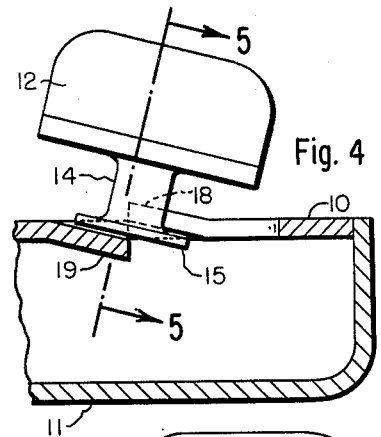
Figure 5:
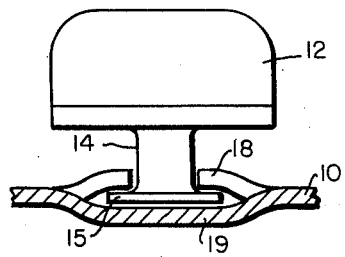
Figure 6:
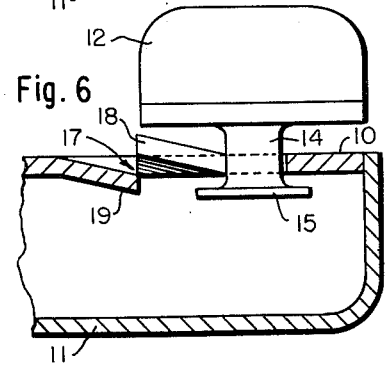

The combined effect of the deflected areas 18 and 19 which lie at an angle of about 10° to the surface of the base 10 is to provide a narrow inclined passage or chute through which the head 15 of the stud may be passed provided it is presented at a corresponding angle as shown in Fig. 4. It is only at this angle that the head can enter or emerge from the inclined passage and this necessitates that the relevant links must be purposefully arranged at the proper angle to effect disengagement. Accidental disengagement is thus well guarded against.

Having thus disclosed my invention I desire to secure by Letters Patent:

In an extensible bracelet or the like a pair of substantially flat links detachably connected together, one link having a stud projecting at substantially a right angle from one side face thereof, said stud comprising a shank having an enlarged head at its outer end, said head having plane parallel inner and outer faces arranged at substantially right angles to said shank, the other of said links having a transverse slit spaced from opposite edges thereof, an elongated slot extending from one side of said slit and spaced from the ends thereof, the portion of said other link adjacent said slit and opposite said slot being inclined away from the plane of said other link, and the edge portion of said other link at each side of said slot and adjacent said slit being inclined away from the plane of said other link in a direction opposite to the inclination of said first portion, said inclined portions on opposite sides of said slit being disposed in spaced substantially parallel planes to form a passageway between them for said head to guide it into and out of said slot.

References Cited in the file of this patent

UNITED STATES PATENTS

| 1,463,949 | Gerber | Aug. 7, 1923 |
| 1,741,434 | Pratt | Dec. 31, 1929 |
| 2,225,746 | Kestenman | Dec. 24, 1940 |